United States Patent Office 3,781,445
Patented Dec. 25, 1973

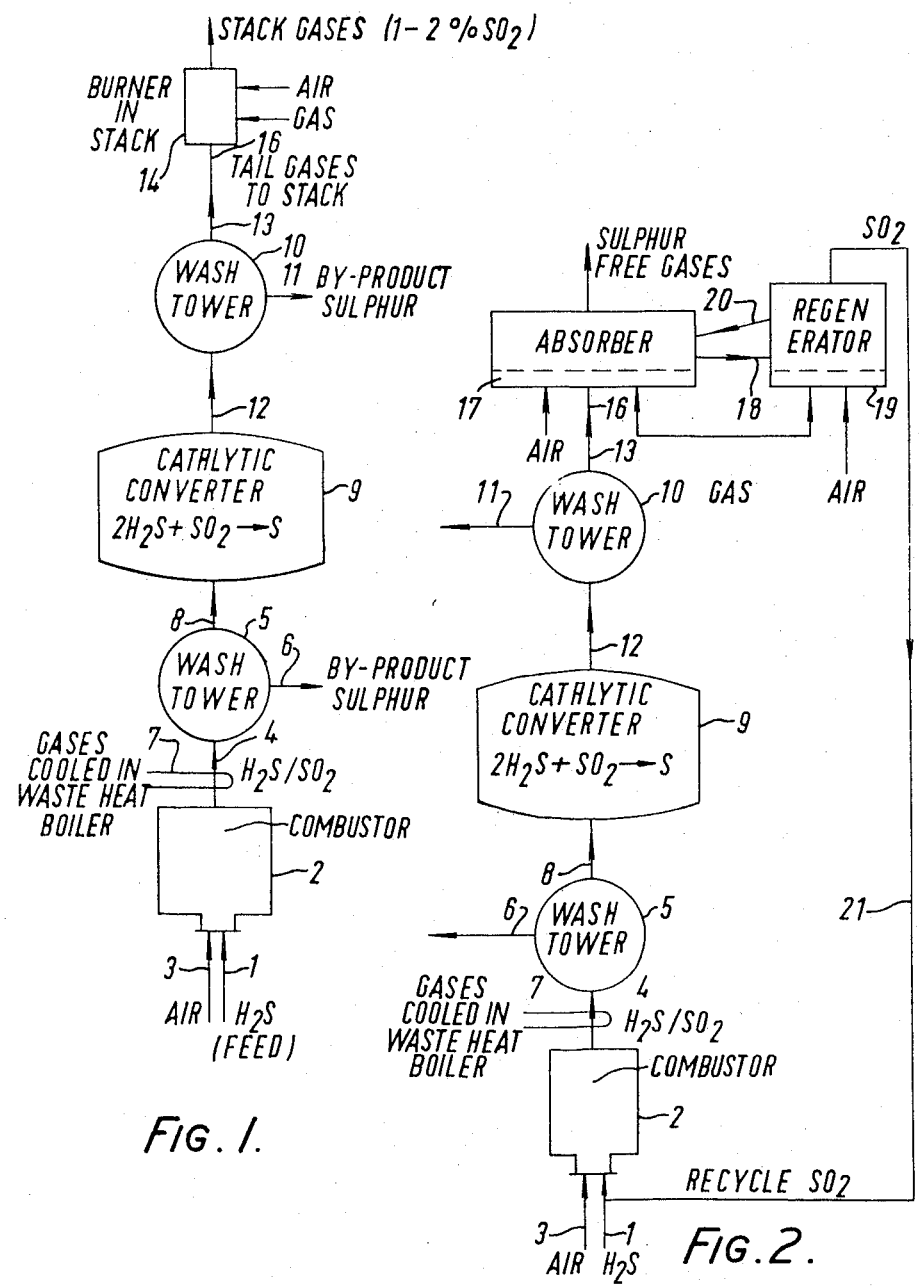

3,781,445
RECOVERY OF SULPHUR
Gerald Moss and Dennis F. Rosborough, Oxford, England, assignors to Esso Research and Engineering Company
Continuation of abandoned application Ser. No. 861,779, Sept. 29, 1969. This application Dec. 10, 1971, Ser. No. 206,808
Int. Cl. C01b 17/04
U.S. Cl. 423—574       2 Claims

ABSTRACT OF THE DISCLOSURE

Tail gas from a Claus unit is contacted with a bed of fluidized sulphur reactive material such as lime under oxidizing conditions in an absorber in order to remove sulfur compounds therein. Essentially sulphur-free gas is discharged from the absorber. Absorber bed material containing sulfate (e.g., $CaSO_4$) is transferred to a regenerator where the corresponding oxide (e.g., CaO) is regenerated under reducing conditions.

---

Figure 3:
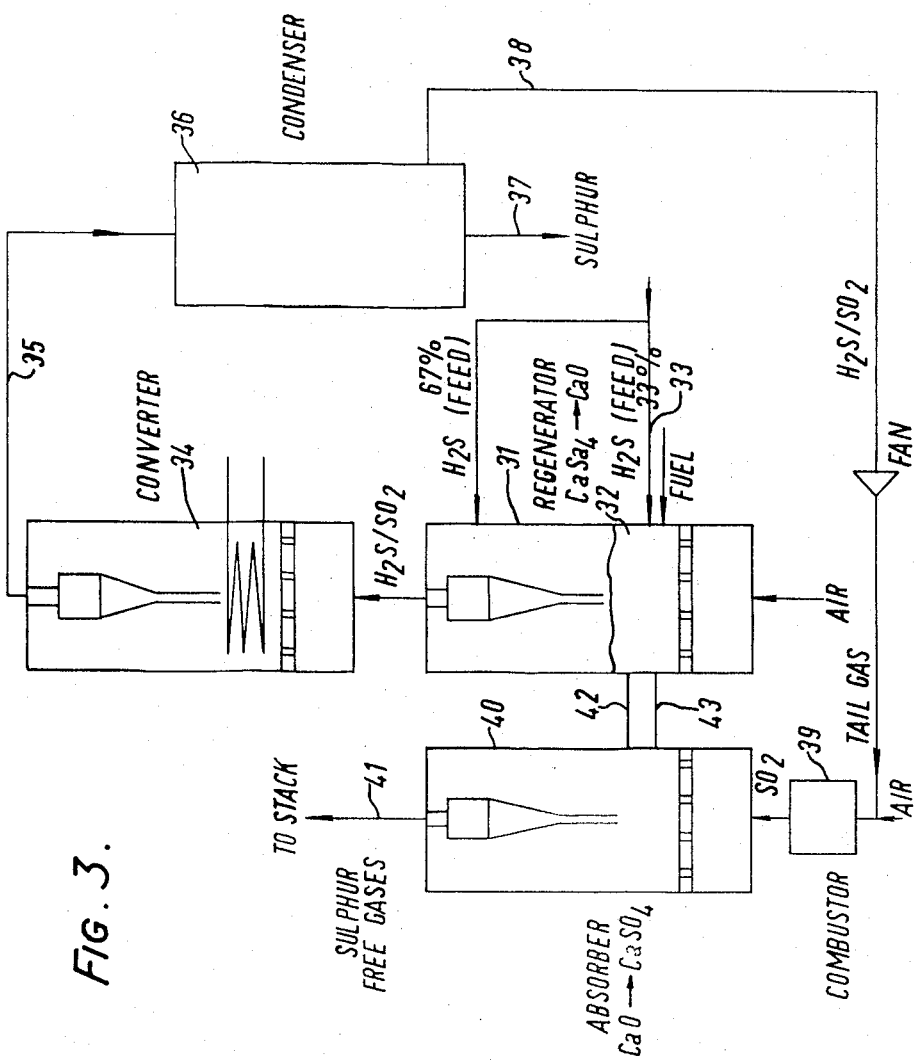

This is a continuation of application Ser. No. 861,779, filed Sept. 29, 1969, now abandoned.

This invention relates to improvements in the recovery of sulphur, particularly from processes, such as the Claus process, in which sulphur dioxide is reacted with hydrogen sulphide to produce elemental sulphur. In the Claus process, which is widely used, $H_2S$ is partly burned with air and the products of the combustion passed through a catalytic converter to yield elemental sulphur which is subsequently condensed and recovered. The Claus process is described in Kirk-Othmer's Encyclopedia of Chemical Technology, vol. 3, p. 146. Sulphur recovery, particularly from effluent gases, e.g. flue gases, serves two important purposes, the recovery of a valuable product and the prevention of the discharge of noxious sulphur gases to the atmosphere.

In the copending U.S. patent application of Gerald Moss, one of the inventors herein, Ser. No. 734,816, filed June 5, 1968 and now abandoned, there is disclosed a process for the removal of sulphur and sulphur containing compounds, from sulphur containing hydrocarbons, by passing the hydrocarbon through a fluidized bed of a compound that reacts with the sulphur, or sulphur compounds, to form solid compounds therewith and from which the sulphur can be regenerated. The described reaction may be carried out under oxidizing conditions, with the formation of sulphates, or under reducing conditions, with the formation of sulphides. Examples of suitable fluidized bed materials are the carbonates and oxides of calcium and magnesium or iron oxides. The carbonates decompose, on heating, to form the oxides.

The sulphur containing hydrocarbons may be burned, at least partly, in the fluidized bed or products of their combustion, or part combustion, may be passed into the fluidized bed. Examples of sulphur containing hydrocarbons are hydrocarbon fuel oils and coal.

We have found, in accordance with the co-pending U.S. patent application Ser. No. 734,816, that $SO_2$ may be effectively absorbed by a suitable fluidized bed material under oxidizing conditions to form sulphates and that the resulting sulphates may be decomposed to yield $SO_2$, particularly under mildly reducing conditions; for example a fluidized bed of lime will effectively react with $SO_2$ to form $CaSO_4$ under oxidizing conditions at temperatures in the range of 800–950° C. and calcined dolomite will fix $SO_2$ at temperatures as low as 650° C., largely as $CaSO_4$. It has been established that $CaSO_4$ is readily decomposed under mildly reducing conditions, at temperatures e.g. in the region of 1050° C., to yield $SO_2$. In that invention fuel is at least partly burned in a combustion zone containing a fluidized bed of sulphur reactive material, as hereinbefore referred to, e.g. a bed of lime operated at a temperature of 850° C., in the presence of oxygen, suitably provided by air, or an air/oxygen mixture, and the resulting sulphate passed to a regenerator, where the product, e.g. $CaSO_4$ is decomposed to liberate $SO_2$, e.g. at 1050° C. For partial burning of the fuel a sub-stoichiometric amount of oxygen is used, e.g. 40 to 60% of the stoichiometric amount. The oxide remaining after removal of $SO_2$ is preferably returned to the combustion zone.

In the present invention, which adapts the process of the aforesaid invention, a conventional sulphur recovery, e.g. a conventional Claus, process is adapted to improve sulphur recovery efficiency and reduce air pollution from sulphur oxides.

In the conventional Claus process, $H_2S$ is burned with deficient air in a combustor to produce, e.g. two volumes of $H_2S$ and one volume of $SO_2$. The combustion products are cooled in a waste heat boiler and elemental sulphur recovered in a wash tower. Further reaction is promoted in a catalytic converter, containing, e.g. bauxite as catalyst, and the balance of the sulphur recovered in a second wash tower. The tail gases containing unreacted $H_2S$ or $SO_2$ are passed to a burner located in the base of the stack. The final flue gases emerging from the stack usually contain between one and two percent $SO_2$.

In a proposed modification, the burner in the stack is replaced by a preferably shallow, fluidized bed absorber to remove $SO_2$ as $CaSO_4$. The bed temperature is maintained in the desired range by firing with gas and the effluent gases are effectively desulphurized with benefits for air pollution control, stack corrosion and improved yields on the Claus process.

The absorber bed material is regenerated in a separate fluid bed unit, preferably external to the stack, and which is fired with gas under mildly reducing conditions to regenerate the CaO. The concentrated $SO_2$ stream from the regenerator is recycled to the Claus combustor unit to recover both sensible heat and $SO_2$. To maintain the correct balance of $H_2S$ and $SO_2$ fed to the converter the air supply to the combustor would need to be reduced to accommodate the recycled $SO_2$.

The invention is further illustrated by reference to the accompanying drawings in which FIG. 1 diagrammatically illustrates a conventional Claus sulphur removal process, FIG. 2 diagrammatically illustrates a conversion of the equivalent of the Claus process to incorporate the invention, and FIG. 3 is a diagrammatic representation of a further modification in accordance with the invention.

Referring to FIG. 1 of the drawings, showing a conventional Claus process, $H_2S$ is fed through a line 1 to a combustion chamber 2 and burned therein with a sub-stoichiometric amount of air, fed through line 3, to produce $H_2S$ and $SO_2$. The combustion products pass, via a line 4, to a wash tower 5, where elemental sulphur is recovered, via line 6. The gases passing through line 4 to wash tower 5 are cooled, e.g. in a waste heat boiler 7. The remaining gases pass via line 8 to a catalytic converter 9, containing, e.g. bauxite, where further reaction is promoted and the products pass from the converter 9, through line 12, to a second wash tower 10 where further sulphur is removed and recovered via line 11. The tail gases, containing unreacted $H_2S$ or $SO_2$ pass via line 13 to a burner 14 located in the base of the stack 16. The final flue gases emerge from the stack and usually contain between 1 and 2% $SO_2$.

As is shown in FIG. 2, in accordance with the invention, the burner in the stack 16 is replaced by a fluidized bed absorber 17, containing e.g. CaO, which removes residual $SO_2$ as $CaSO_4$. The absorber bed material is passed via line 18 to a regenerator 19 and regenerated CaO returned via line 20 to the absorber 17. The concentrated $SO_2$ stream from the regenerator 19 is recycled via line 21 to the line 1.

In the form of the invention shown in FIG. 3, $SO_2$ may be produced in a regenerator, by combustion of a proportion, e.g. one-third, of the $H_2S$ feed, fed through line 33, in the bed 32 of the regenerator 31. The remainder of the $H_2S$ feed, e.g. two-thirds, is mixed with $SO_2$ in a fluid bed converter 34, maintained at the desired temperature by heat exchange surfaces. Products from the converter pass through line 35 to a condenser 36 where sulphur may be removed through line 37. Unreacted $H_2S$ and $SO_2$ pass, via line 38 to a combustion chamber 39 and thence to a fluidized bed absorber 40 containing, e.g. a fluidized bed of lime; sulphur is absorbed as sulphate and sulphur free gases pass via line 41 to the stack. The reacted fluidized bed material passes via line 42 to the regenerator 32 and regenerated fluidized bed material is returned to the absorber via line 43.

What we claim is:

1. A process for treating gases comprising hydrogen sulphide to yield as products elemental sulphur and a substantially sulphur-free effluent gas, which comprises:
    (a) dividing said gases containing hydrogen sulphide into two portions;
    (b) oxidizing hydrogen sulphide in the smaller portion with an oxygen-containing gas in a regeneration zone in the presence of a fluidized bed material containing iron sulphate or an alkaline earth sulphate, said sulphate being formed as hereinafter specified in step (d), whereby said sulphate is decomposed to the corresponding oxide and sulphur dioxide is evolved;
    (c) combining the sulphur dioxide evolved in step (b) with the larger portion of said gases containing hydrogen sulphide in a converter, thereby forming elemental sulphur and tail gas, and separating said elemental sulphur from said tail gas;
    (d) burning any hydrogen sulphide in the tail gas to sulphur dioxide and passing the sulphur dioxide-containing gas mixture and oxygen into an absorption zone containing a fluidized bed comprising iron oxide or an alkaline earth metal oxide or carbonate to form a metal sulphate and said substantially sulphur-free gas;
    (e) transferring sulphate-containing fluidized bed material from said absorption zone to said regeneration zone and transferring the corresponding metal oxide from the regeneration zone to the absorption zone; and
    (f) discharging said substantially sulphur-free gas from the absorption zone.

2. A process according to claim 1 in which the fluidized bed material in said absorption zone comprises calcium oxide.

References Cited

UNITED STATES PATENTS

| 1,244,280 | 10/1917 | Basset | 106—103 |
| 2,765,217 | 10/1956 | Conroy et al. | 423—575 |
| 3,087,790 | 4/1963 | Wheelock et al. | 423—541 |
| 3,460,912 | 8/1969 | Squires | 423—574 |

FOREIGN PATENTS

| 435,560 | 9/1953 | Great Britain. |
| 716,264 | 9/1954 | Great Britain |
| 776,319 | 6/1957 | Great Britain. |
| 744,908 | 2/1956 | Great Britain. |

GEORGE O. PETERS, Primary Examiner

U.S. Cl. X.R.

423—575